United States Patent
Himmelmann

(10) Patent No.: US 11,824,424 B2
(45) Date of Patent: Nov. 21, 2023

(54) COMBINED INTEGRATED WASTE HEAT RECOVERY AND INLET PRESSURE BOOST SYSTEM

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 166 days.

(21) Appl. No.: 17/472,276

(22) Filed: Sep. 10, 2021

(65) Prior Publication Data

US 2023/0081489 A1 Mar. 16, 2023

(51) Int. Cl.
*H02K 7/18* (2006.01)
*F02C 3/04* (2006.01)
*H02K 7/00* (2006.01)

(52) U.S. Cl.
CPC .............. *H02K 7/183* (2013.01); *F02C 3/04* (2013.01); *H02K 7/003* (2013.01); *F05D 2220/76* (2013.01); *F05D 2240/35* (2013.01); *F05D 2240/60* (2013.01)

(58) Field of Classification Search
CPC ......... H02K 7/183; H02K 7/003; F02C 3/04; F02C 7/08; F05D 2220/76; F05D 2240/35; F05D 2240/60; F05D 2260/213
USPC ...................................................... 290/44, 55
See application file for complete search history.

(56) References Cited

U.S. PATENT DOCUMENTS

| | | | |
|---|---|---|---|
| 4,773,846 A * | 9/1988 | Munk | F02C 3/30 431/190 |
| 6,987,329 B1 | 1/2006 | Smith et al. | |
| 8,191,571 B2 | 6/2012 | Himmelmann et al. | |
| 8,546,680 B2 | 10/2013 | Hsu | |
| 8,866,334 B2 * | 10/2014 | Donnelly | H02J 3/381 290/43 |
| 10,619,853 B2 | 4/2020 | Tsuei et al. | |
| 10,907,640 B2 | 2/2021 | Hammoud | |

(Continued)

FOREIGN PATENT DOCUMENTS

EP 2876280 A1 5/2015
EP 3653858 A1 5/2020

OTHER PUBLICATIONS

Partial European Search Report for EP Application No. 22194935.7, dated Feb. 8, 2023, pp. 1-14.

(Continued)

*Primary Examiner* — Charles Reid, Jr.
(74) *Attorney, Agent, or Firm* — CANTOR COLBURN LLP

(57) ABSTRACT

The electrical power generation system including a micro-turbine alternator. The micro-turbine alternator including a combustor, at least one turbine configured to be driven by an exhaust from the combustor, at least one compressor operably connected to the combustor to provide a compressed airflow to the combustor, one or more shafts connecting the at least one turbine to the at least one compressor such that rotation of the at least one turbine drives rotation of the at least one compressor, and a recuperator configured to transfer heat from the exhaust exiting the at least one turbine to the compressed airflow from the at least one compressor entering the combustor.

12 Claims, 5 Drawing Sheets

(56) References Cited

U.S. PATENT DOCUMENTS

| | | |
|---|---|---|
| 2004/0045594 A1 | 3/2004 | Hightower |
| 2005/0126182 A1 | 6/2005 | Teets et al. |
| 2012/0324903 A1 | 12/2012 | Dewis et al. |
| 2013/0213050 A1 | 8/2013 | Shakariyants |
| 2017/0226928 A1 | 8/2017 | Taguchi et al. |
| 2017/0292450 A1 | 10/2017 | Kutnjak et al. |
| 2020/0191048 A1* | 6/2020 | Homison ................. F02B 37/20 |
| 2020/0340398 A1 | 10/2020 | Kornilov et al. |
| 2020/0348083 A1 | 11/2020 | Kornilov et al. |
| 2022/0065125 A1* | 3/2022 | Spencer .................. F01D 15/08 |

OTHER PUBLICATIONS

Qu et al., "Parameric Study on Thermoelectric Power Generator and Microturbine Combined Power Generation System", Chemical Engineering Transactions, vol. 70, 2018, pp. 1-6.

Extended European Search Report for EP Application No. 22194935.7, dated May 11, 2023, pp. 1-12.

* cited by examiner

COMBINED INTEGRATED WASTE HEAT RECOVERY AND INLET PRESSURE BOOST SYSTEM

BACKGROUND

The embodiments herein generally relate to electrical power generation systems and more specifically, a waste heat recovery system and an inlet pressure boost system for use in the electrical power generation system.

Some systems, such as unmanned aerial vehicles (UAV's) or the like often utilize electrical power for propulsion and operation of onboard systems. Some such systems, such as medium-sized UAV's that require power levels in the range of about 1 KW to 30 KW, have relatively short mission times because the energy density of batteries is far too low to effectively work in this power range, and conventional internal combustion engines and jet engines are very inefficient at these low power levels. One option that has been developed is a tethered UAV system in which the UAV is connected to a power source on the ground by a tether. Use of a tethered UAV allows for an increase in mission duration time, but reduces an operating height and distance in which the UAV may operate, due to the constraint of the tether. An untethered efficient power source that is lightweight with a high power density is greatly desired.

BRIEF SUMMARY

According to one embodiment, an electrical power generation system, is provided. The electrical power generation system including a micro-turbine alternator. The micro-turbine alternator including a combustor, at least one turbine configured to be driven by an exhaust from the combustor, at least one compressor operably connected to the combustor to provide a compressed airflow to the combustor, one or more shafts connecting the at least one turbine to the at least one compressor such that rotation of the at least one turbine drives rotation of the at least one compressor, and a recuperator configured to transfer heat from the exhaust exiting the at least one turbine to the compressed airflow from the at least one compressor entering the combustor.

In addition to one or more of the features described above, or as an alternative, further embodiments may include that the at least one compressor includes a first stage compressor, a second stage compressor, and a third stage compressor. The recuperator is configured to transfer heat from the exhaust exiting the at least one turbine to the compressed airflow from the third stage compressor entering the combustor.

In addition to one or more of the features described above, or as an alternative, further embodiments may include that the at least one turbine includes a first stage turbine, and a second stage turbine.

In addition to one or more of the features described above, or as an alternative, further embodiments may include a thermal electric generator array including a hot side passageway configured to receive the exhaust from the recuperator, a cold side passageway configured to transfer air to the at least one compressor, a hot side heat transfer surface thermally connected to the hot side passageway, a cold side heat transfer surface thermally connected to the cold side passageway, and a thermo electric device interposed between the hot side heat transfer surface and the cold side heat transfer surface. The thermo electric device being configured to generate an electrical current based on a temperature difference between the cold side heat transfer surface and the hot side heat transfer surface.

In addition to one or more of the features described above, or as an alternative, further embodiments may include a bottoming system including a bottoming blower configured to deliver air to the at least one compressor, a bottoming drive shaft, and a bottoming turbine operably connected to the bottoming blower through the bottoming drive shaft, wherein the bottoming blower is configured to rotate when the bottoming turbine is rotated by the exhaust.

In addition to one or more of the features described above, or as an alternative, further embodiments may include an electric generator disposed along the one or more shafts such that electrical power is generated via rotation of the one or more shafts. The electric generator is disposed along the one or more shafts between the first stage compressor and the second stage compressor.

In addition to one or more of the features described above, or as an alternative, further embodiments may include that at least one of the one or more shafts passes through the electric generator.

According to another embodiment, an electrical power generation system is provided. The electrical power generation system including a micro-turbine alternator. The micro-turbine alternator including a combustor, at least one turbine configured to be driven by an exhaust from the combustor, at least one compressor operably connected to the combustor to provide a compressed airflow to the combustor, one or more shafts connecting the at least one turbine to the at least one compressor such that rotation of the at least one turbine drives rotation of the at least one compressor, and a thermal electric generator array. The thermal electric generator array including a hot side passageway configured to receive the exhaust from the at least one turbine, a cold side passageway configured to transfer air to the at least one compressor, a hot side heat transfer surface thermally connected to the hot side passageway, a cold side heat transfer surface thermally connected to the cold side passageway, and a thermo electric device interposed between the hot side heat transfer surface and the cold side heat transfer surface. The thermo electric device being configured to generate an electrical current based on a temperature difference between the cold side heat transfer surface and the hot side heat transfer surface.

In addition to one or more of the features described above, or as an alternative, further embodiments may include that the at least one compressor includes a first stage compressor, a second stage compressor, and a third stage compressor. The cold side passageway configured to transfer air to the first stage compressor.

In addition to one or more of the features described above, or as an alternative, further embodiments may include the at least one turbine includes a first stage turbine and a second stage turbine. The hot side passageway is configured to receive the exhaust from the second stage turbine.

In addition to one or more of the features described above, or as an alternative, further embodiments may include a bottoming system. The bottoming system includes a bottoming blower configured to deliver air to the at least one compressor, a bottoming drive shaft, and a bottoming turbine operably connected to the bottoming blower through the bottoming drive shaft, wherein the bottoming blower is configured to rotate when the bottoming turbine is rotated by the exhaust.

In addition to one or more of the features described above, or as an alternative, further embodiments may include an electric generator disposed along the one or more shafts such that electrical power is generated via rotation of the one or more shafts. The electric generator is disposed along the one or more shafts between the first stage compressor and the second stage compressor.

In addition to one or more of the features described above, or as an alternative, further embodiments may include at least one of the one or more shafts passes through the electric generator.

According to another embodiment, an electrical power generation system is provided. The electrical power generation system including a micro-turbine alternator. The micro-turbine alternator including a combustor, at least one turbine configured to be driven by an exhaust from the combustor, at least one compressor operably connected to the combustor to provide a compressed airflow to the combustor, one or more shafts connecting the at least one turbine to the at least one compressor such that rotation of the at least one turbine drives rotation of the at least one compressor, and a bottoming system. The bottoming system including a bottoming blower configured to deliver air to the at least one compressor, a bottoming drive shaft, and a bottoming turbine operably connected to the bottoming blower through the bottoming drive shaft. The bottoming blower is configured to rotate when the bottoming turbine is rotated by the exhaust.

In addition to one or more of the features described above, or as an alternative, further embodiments may include that the at least one compressor includes a first stage compressor, a second stage compressor, and a third stage compressor. The bottoming blower is configured to provide air to the first stage compressor.

In addition to one or more of the features described above, or as an alternative, further embodiments may include the at least one turbine includes a first stage turbine and a second stage turbine. The bottoming turbine is configured to receive the exhaust from the second stage turbine.

In addition to one or more of the features described above, or as an alternative, further embodiments may include an electric generator disposed along the one or more shafts such that electrical power is generated via rotation of the one or more shafts. The electric generator is disposed along the one or more shafts between the first stage compressor and the second stage compressor.

In addition to one or more of the features described above, or as an alternative, further embodiments may include at least one of the one or more shafts passes through the electric generator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 3:
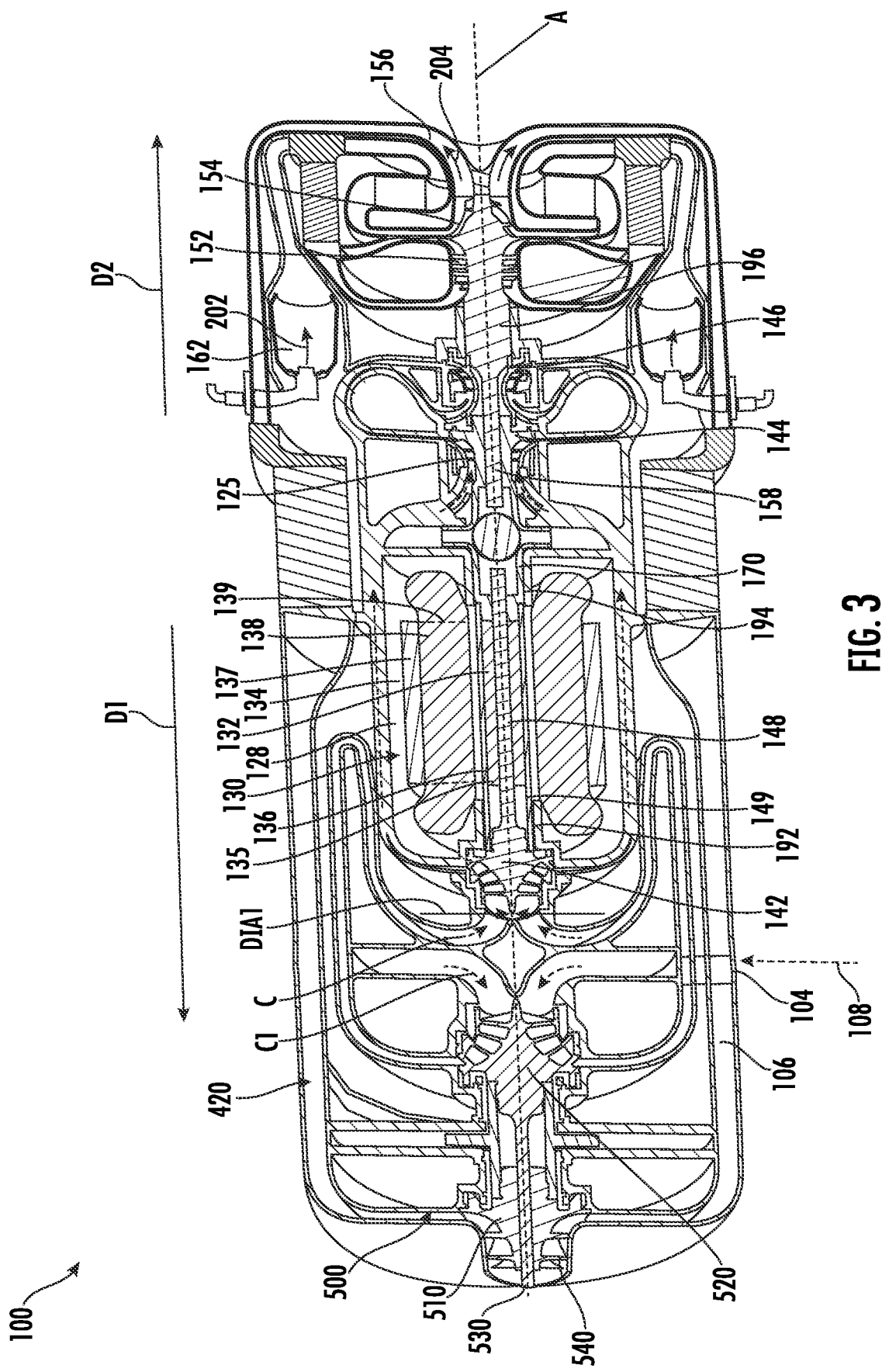
FIG. 3 is an isometric cut-away view of a micro-turbine alternator for use in the power generation system of FIGS. 1 and 2, according to an embodiment of the present disclosure.
Figure 4:
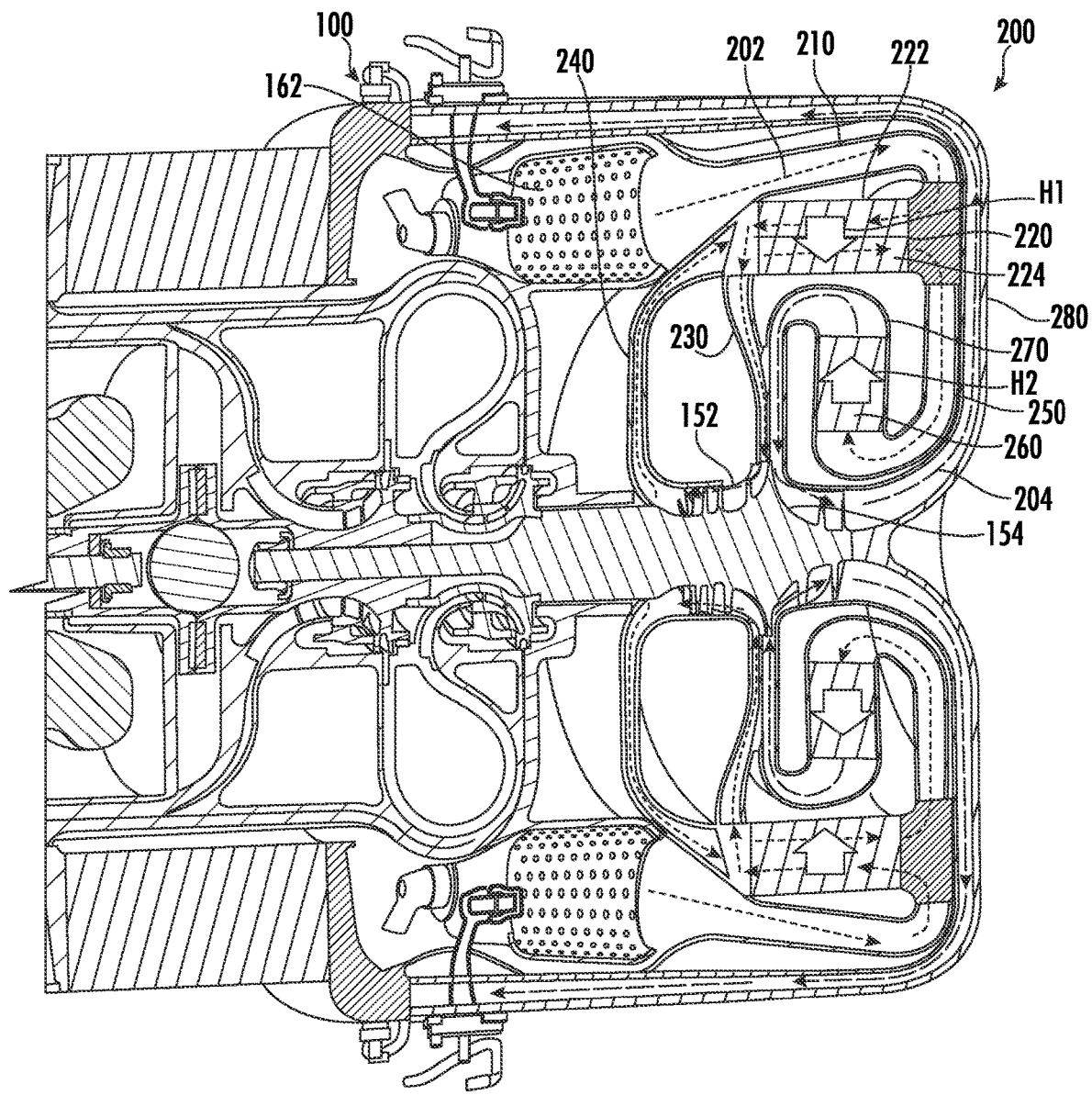
Figure 5:
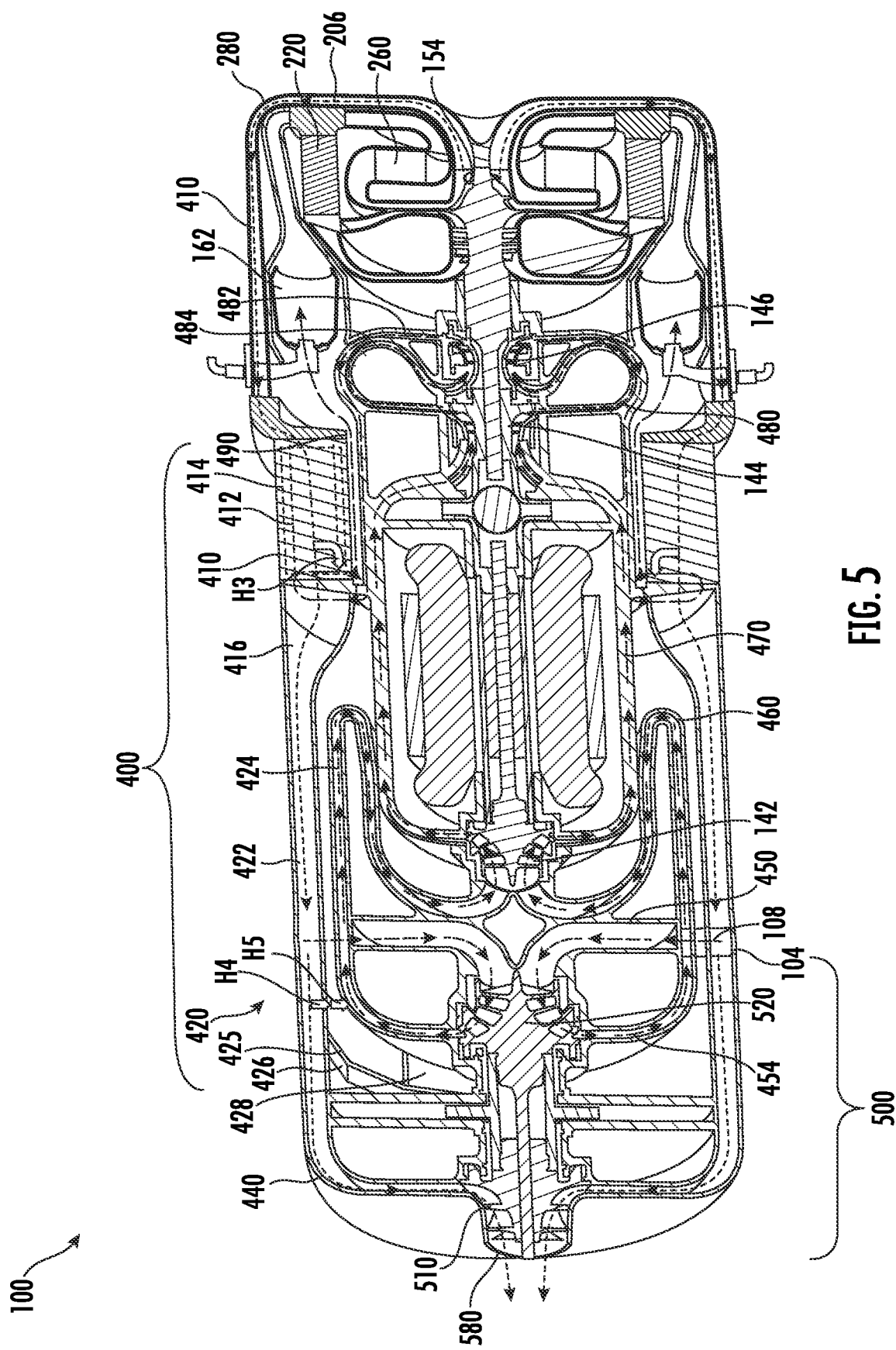

FIG. 4 is an enlarged isometric cut-away view of an exhaust turbine reheat cycle and catalytic converter of the micro-turbine alternator of FIG. 3, according to an embodiment of the present disclosure; and FIG. 5 is an enlarged isometric cut-away view of a waste heat recovery system and an inlet pressure boost system of the micro-turbine alternator of FIG. 3, according to an embodiment of the present disclosure.

DETAILED DESCRIPTION

A detailed description of one or more embodiments of the disclosed apparatus and method are presented herein by way of exemplification and not limitation with reference to the Figures.

As previously noted, an untethered, lightweight, high power density power source would allow systems like UAVs to have longer mission times without the height and distance limits of a tether. A prior approach to power generation involves micro-turbine alternator designs that places the electric generator at a forward end of a rotating shaft upstream of the compressor and turbine, which are then both located at an aft end of a rotating shaft. With this type of arrangement, the rotational speed of the compressor is limited by the compressor inlet relative velocity as the inlet diameter of the compress hub is increased to accommodate the rotating shaft that connects the compressor hub to the electric generator. Further, with this type of arrangement the compressor and turbine are overhung on the aft end of the rotating shaft, thus reducing the critical speed of the overall assembly. Embodiments disclosed herein relate to an inter-stage electric alternator for micro-turbine alternator applications. The micro-turbine alternator according to one or more embodiments may be used in a UAV or electrically-powered suit, as discussed for explanatory purposes, or any electrically-powered system. The design places an electric generator between two stages of the compressor to reduce the inlet diameter of the first stage compressor hub to as close to zero as possible so that the micro-turbine alternator may provide more power and operate with a lower inlet pressure.

Embodiments disclosed herein utilized a combustor to drive the turbine, rotating shaft, and compressor. Compressed air from the compressor is fed into the combustor and then fuel is added to the air and ignited.

In conventional combustor systems, with ignition the temperature of the air is raised up to a desired inlet temperature of a turbine. This compressed and heated air then enters the turbine inlet. The air enters the turbine at approximately a high temperature, which is near the thermal limit of the material used to manufacture the turbine. As the air passes through the turbine, it expands and cools, transferring energy to the turbine blades, causing the turbine to rotate. In a single stage turbine, the temperature of the air that leaves the turbine is still fairly high, resulting in energy leaving the engine, without doing useful work. This leads to a reduced engine efficiency.

Embodiments disclosed herein seek to make use of the aforementioned additional energy that left the engine. The embodiments disclosed herein accomplish this by utilizing a multi-stage turbine with an integrated re-heat cycle. Advantageously, using a two-stage turbine allows the engine to operate at higher rotational speeds, for a given power level.

This is accomplished because the two smaller turbines are required to carry the torque that would normally be provided by a single, larger diameter turbine. The larger the diameter of a rotating machine, the larger the stresses are, for a given rotational speed. Creating the smaller diameter turbines allows the engine to operate at a higher rotational speed, for a given stress level.

Embodiments disclosed herein utilize a reheat cycle where heat is transferred from exhaust proximate to an inlet of the first stage turbine to exhaust proximate the inlet of a second stage turbine. Advantageously, this reduces the temperature of exhaust entering the first stage turbine, thus increasing the operating life of the first stage turbine. Also, advantageously, this increases the temperature of exhaust entering the second stage turbine, thus increasing the efficiency of the second stage turbine.

Embodiments disclosed herein also utilize a catalytic converter to heat the combustor exhaust prior to entry into the second stage turbine. Advantageously, by adding additional heat to the exhaust using the catalytic converter, less fuel will be required in the combustor to provide the necessary heat energy to support the micro-turbine engine's output power requirements. This reduction in fuel input, for a given output power level, will increase the micro-turbine engine's thermodynamic efficiency. Also, advantageously, the catalytic converter helps reduces noxious exhaust emissions existing from an outlet of the micro-turbine engine.

The embodiments disclosed herein relate to a combined, integrated waste heat recovery and inlet pressure boost system for the micro-turbine generator. The system includes a recuperator, a thermoelectric generator array, a bottoming system turbine, and a bottoming system blower.

Figure 1:
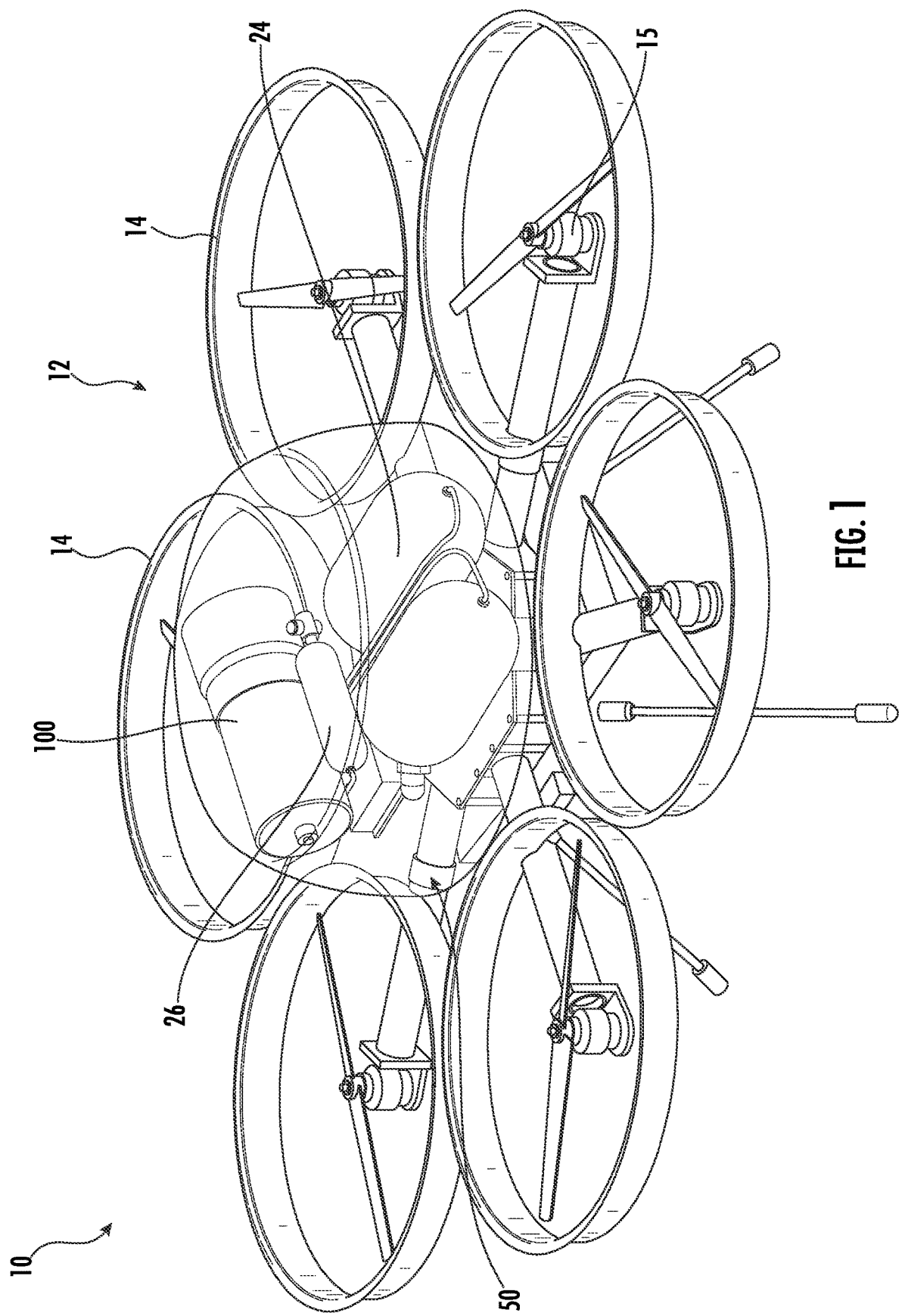
FIG. 1 is an isometric view of an unmanned aerial vehicle including a power generation system, according to an embodiment of the present disclosure.

Referring to FIG. 1, an isometric view of an unmanned aerial vehicle (UAV) 10 is illustrated in accordance with an embodiment of the present disclosure. The UAV 10 includes a propulsion/lift system 12, for example a plurality of lift rotors 14, operably connected to an electrical power generation system 50, which includes a micro-turbine alternator system 100. In an embodiment, the micro-turbine alternator system 100 is a high efficiency Brayton cycle micro-turbine alternator. The UAV 10 includes a propulsion system having electric motors 15 and lift rotors 14 associated with each electric motor 15. Each lift rotor 14 is operably connected to the electric motor 15 that is configured to rotate the lift rotor 14 using electrical power generated by the micro-turbine alternator system 100 of the electrical power generation system 50. The micro-turbine alternator system 100 is configured to convert fuel to electrical power to power at least the electric motors 15 of the lift rotors 14. The fuel is provided from one or more fuel storage tanks 24 operably connected to the micro-turbine alternator system 100. In some embodiments, the fuel utilized is JP-8. The micro-turbine alternator system 100 may utilize compressed air provided from a compressed air tank 26 at 4500 psig and regulated to about 750 psig. The compressed air from the compressed air tank 26 of FIG. 1 may be utilized to provide the motive pressure required to drive the liquid fuel through a turbine speed control valve (not shown) and into a combustion chamber. Alternatively, an electric driven pump may be used in place of the compressed air.

Figure 2:
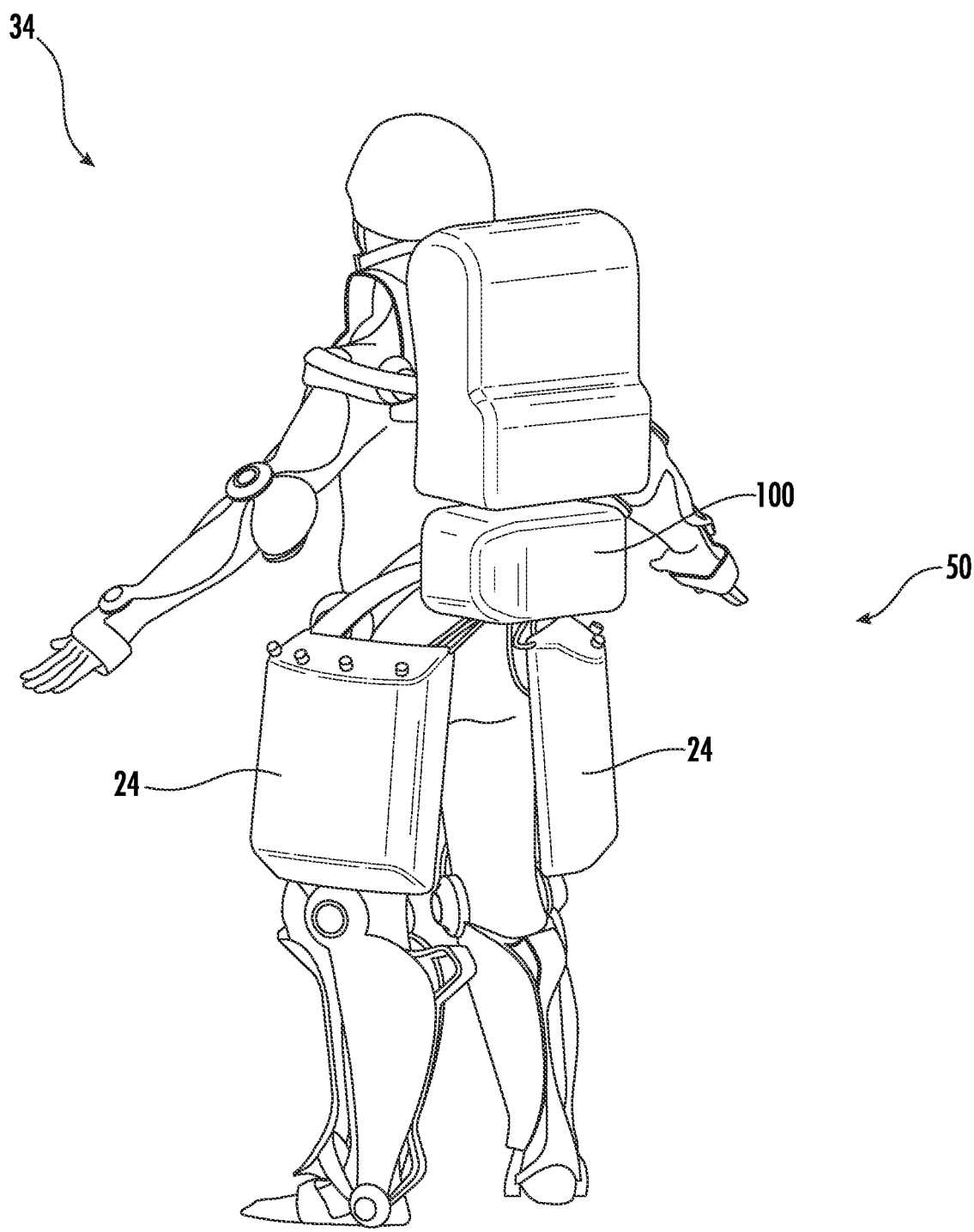
FIG. 2 is an isometric view of a powered suit including a power generation system, according to an embodiment of the present disclosure.

Referring now to FIG. 2, with continued reference to FIG. 1, an isometric view of an electrically-powered suit 34 is illustrated in accordance with an embodiment of the present disclosure. While in FIG. 1, the micro-turbine alternator system 100 is described as utilized in a UAV 10, the micro-turbine alternator system 100 disclosed herein may be readily applied to other systems, and may be utilized in, for example, an electrically-powered suit 34, as shown in FIG. 2.

The electrically-powered suit 34 is operably connected to an electrical power generation system 50, which includes a micro-turbine alternator system 100. The micro-turbine alternator system 100 is configured to convert fuel to electrical power to power the electrically-powered suit 34. The fuel is provided from one or more fuel storage tanks 24 operably connected to the micro-turbine alternator system 100. In some embodiments, the fuel utilized is JP-8. The fuel storage tanks 24 may be located on legs of the electrically-powered suit 34, as illustrated in FIG. 2.

It is understood that the micro-turbine alternator system 100 is not limited to a UAV 10 and an electrically-powered suit 34 application, and the micro-turbine alternator system 100 may be applied to other systems not disclosed herein.

Referring now to FIG. 3, an isometric cut-away view of the micro-turbine alternator system 100 is illustrated, in accordance with an embodiment of the present disclosure. The micro-turbine alternator system 100 includes a first stage compressor 142, a second stage compressor 144, a third stage compressor 146, a first stage turbine 152, and a second stage turbine 154. The first stage compressor 142, the second stage compressor 144, the third stage compressor 146, the first stage turbine 152, and the second stage turbine 154 are oriented along a central longitudinal axis A of the micro-turbine alternator system 100. The micro-turbine alternator system 100 also includes an electric generator 130 located between the first stage compressor 142 and the second stage compressor 144 as measured along the central longitudinal axis A.

Advantageously, by locating the electric generator 130 between the first stage compressor 142 and the second stage compressor 144, the overall physical size of the micro-turbine alternator system 100 is reduced. As a result, the micro-turbine alternator system 100 according to one or more embodiments may be used in a UAV 10, an electrically-powered suit 34, or another system that benefits from untethered, lightweight power generation.

The micro-turbine alternator system 100 also includes an alternator stator cooling heat exchanger 128 configured to utilize airflow from the first stage compressor 142 to cool the electric generator 130. The alternator stator cooling heat exchanger 128 may encircle or enclose the electric generator 130 and may be configured to pass airflow from the first stage compressor 142 through or around the electric generator 130. Advantageously, by locating the electric generator 130 between the first stage compressor 142 and the second stage compressor 144, moderately cool air in the core flow path C from the first stage compressor 142 is forced through the alternator stator cooling heat exchanger 128 and heat may be drawn out of the electric generator 130 and to the airflow within the alternator stator cooling heat exchanger 128.

The electric generator 130 may be a permanent magnet alternator, an induction generator, a switched reluctance generator, a wound field generator, a hybrid generator, or any other type of alternator known to one of skill in the art. As illustrated in FIG. 3, the electric generator 130 may be a permanent magnet alternator that includes a rotor element 132 and a stator element 134 radially outward from the rotor element. In other words, the rotor element 132 is located radially inward from the stator element 134 as measured relative to the central longitudinal axis A. It is understood that the embodiments disclosed herein may be applicable to a rotor element 132 that is located radially outward from the stator element 134. The rotor element 132 may be rotated around the central longitudinal axis A to generate electricity.

The rotor element 132 includes an annular base member 135, an annular array of permanent magnets 136 that are respectively coupled to an outer diameter of the annular base member 135. The rotor element 132 may include a magnet retention band that fits over an outer diameter of the permanent magnet 136, and keeps the permanent magnet 136 on the rotating annular base member 135. In accordance with further embodiments, the stator element 134 includes a hub 137, a plurality of spokes 139 extending radially inward from the hub 137 and conductive elements 138 that are wound around the spokes 139 to form windings. When the rotor element 132 is rotated around the central longitudinal axis A a rotating flux field is generated by the permanent magnets 136 and this rotating flux field generates an alternating current in the conductive elements 138 to generate electricity for use by the UAV 10 of FIG. 1 or the electrically-powered suit 34 of FIG. 2.

The micro-turbine alternator system 100 includes a combustor 162, in which a fuel-air mixture is combusted, with the combustion products utilized to drive an electric generator 130. In some embodiments, the fuel utilized in the combustor 162 is JP-8. The micro-turbine alternator system 100 converts the energy of the combustion products into electrical power by urging the combustion products through the first stage turbine 152 and the second stage turbine 154, which are operably connected to and configured to rotate the rotor element 132 of the electric generator 130. The electrical energy generated by the electric generator 130 may then be rectified via a generator rectifier (not shown) and utilized by the propulsion/lift system 12 of FIG. 1 or the electrically-powered suit 34 of FIG. 2. The compressed air from the compressed air tank 26 of FIG. 1 may be utilized to provide the motive pressure required to drive the liquid fuel through a turbine speed control valve (not shown) and into the combustor 162.

The first stage compressor 142 is located forward of the second stage compressor 144 and the third stage compressor 146 as measured along the central longitudinal axis A, and the second stage compressor 144 is located forward of the third stage compressor 146 as measured along the central longitudinal axis A. In other words, the second stage compressor 144 is located aft of the first stage compressor 142 and the third stage compressor 146 is located aft of the second stage compressor 144 as measured along the central longitudinal axis A. The forward direction D1 and the aft direction D2 are illustrated in FIG. 3. The first stage turbine 152 is located forward of the second stage turbine 154 as measured along the central longitudinal axis A. In other words, the second stage turbine 154 is located aft of the first stage turbine 152 as measured along the central longitudinal axis A. The first stage compressor 142, the second stage compressor 144, and the third stage compressor 146 are located forward of first stage turbine 152 and the second stage turbine 154 as measured along the central longitudinal axis A.

The micro-turbine alternator system 100 includes a compressor shaft 148 oriented along and co-axial to the central longitudinal axis A. In an embodiment, the compressor shaft 148 is a tie bolt and is used to compress a rotating group of components including the first stage compressor 142, compressor transfer tube 149, the compressor shaft 148, and a second journal bearing 194 in the axial direction, causing the multi-segment shaft to act as a single stiff shaft. The compressor shaft 148 may be attached or operably connected to the first stage compressor 142. The micro-turbine alternator system 100 includes a turbine shaft 158 oriented along and co-axial to the central longitudinal axis A. The turbine shaft 158 may be attached or operably connected to the first stage turbine 152 and the second stage turbine 154.

The micro-turbine alternator system 100 includes a coupling assembly 170 configured to operably connect the turbine shaft 158 to the compressor shaft 148. The coupling assembly 170 may be attached or operably connected to the second stage compressor 144. The compressor shaft 148 extends in the aft direction D2 away from the first stage compressor 142 and through the electric generator 130 to operably connect to the coupling assembly 170. In an embodiment, the compressor shaft 148 is located radially inward of the rotor element 132.

Advantageously, locating the electric generator 130 between the first stage compressor 142 and the second stage compressor 144 allows the first stage compressor 142 to have a reduced inlet hub diameter that is smaller than a diameter of the rotor element 132. Having a reduced inlet hub diameter DIA1 reduces the inlet flow relative velocity, increasing the aerodynamic performance of the first stage compressor 142 and increasing the swallowing capacity of the first stage compressor 142. If the electric generator 130 was located forward of the first stage compressor 142, then the compressor shaft 148 would have to extend forward of the first stage compressor 142 and thus the inlet hub diameter DIA1 would have to be increased to a diameter of the compressor shaft 148, thus decreasing the aerodynamic performance of the first stage compressor 142 and decreasing the swallowing capacity of the first stage compressor 142.

The turbine shaft 158 extends in the forward direction D1 away from the first stage turbine 152 to operably connect to the coupling assembly 170. The turbine shaft 158, the coupling assembly 170, and the compressor shaft 148 are configured to rotate in unison. Thus, when combustor exhaust 202 from the combustor 162 drives rotation of the first stage turbine 152 and when catalytic exhaust 204 drives rotation from the second stage turbine 154, the rotation of the first stage turbine 152 and the second stage turbine 154 drives rotation of the turbine shaft 158, which drives rotation of the coupling assembly 170 and the compressor shaft 148. The rotation of the compressor shaft 148 drives rotation of the first stage compressor 142. The rotation of the coupling assembly 170 drives rotation of the second stage compressor 144. The third stage compressor 146 is operably connected to the second stage compressor 144 and the turbine shaft 158, and thus rotation of the second stage compressor 144 and the turbine shaft 158 drives rotation of the third stage compressor 146.

It is understood that while the compressor shaft 148, the turbine shaft 158, and the coupling assembly 170 are described as three different shafts, the embodiments disclosed herein may be applicable to micro-turbine alternator system 100 having one or more shafts. In an embodiment, the electric generator 130 is disposed along the one or more shafts between the first stage compressor 142 and the second stage compressor 144. In another embodiment, the electric generator 130 is disposed along the compressor shaft 148 between the first stage compressor 142 and the second stage compressor 144. The electric generator 130 is located aft of the first stage compressor 142 and forward of the second stage compressor 144. In another embodiment, at least one of the one or more drive shafts passes through the electric generator 130. In another embodiment, the compressor shaft 148 passes through the electric generator 130.

The compressor shaft 148, the turbine shaft 158, and the coupling assembly 170 are coaxial and rotate via the bearing systems about the central longitudinal axis A, which is colinear with their longitudinal axes. The bearing system includes a first journal bearing 192 located between the compressor transfer tube 149 and the frame 106 of the micro-turbine alternator system 100. The bearing system includes a second journal bearing 194 located between the coupling assembly 170 and the frame 106 of the micro-turbine alternator system 100. The bearing system includes a third journal bearing 196 located between the turbine shaft 158 and the frame 106 of the micro-turbine alternator system 100.

Advantageously, locating the electric generator 130 between the first stage compressor 142 and the second stage compressor 144 provides for very effective bearing placement around the compressor shaft 148, which increases the stiffness of the compressor shaft 148. The increased stiffness of the compressor shaft 148 allows for an increase in the critical speed of the compressor shaft 148.

Also, advantageously, by locating the electric generator 130 between the first stage compressor 142 and the second stage compressor 144, the alternator stator cooling heat exchanger 128 helps reduce the operating temperature of the electric generator 130, while the airflow through the alternator stator cooling heat exchanger 128 also experiences a pressure drop. This pressure drop through the alternator stator cooling heat exchanger 128 forces some of the airflow from the first stage compressor 142 through the rotor element 132 and to a stator gap between the rotor element 132 and the stator element 134, which provides cooling air to the rotor element 132, the first journal bearing 192, and the second journal bearing 194.

The compressor transfer tube 149 extends from the first stage compressor 142 to the second stage compressor 144 through the electric generator 130. The compressor transfer tube 149 is co-axial with the electric generator 130. The rotor element 132 with the annular base member 135 and the annular array of permanent magnets 136 are located radially inward of the compressor transfer tube 149 measured relative to the central longitudinal axis A. The stator element 134 with the hub 137, the conductive elements 138, and the spokes 139 are located radially outward of the compressor transfer tube 149 measured relative to the central longitudinal axis A.

The first stage compressor 142, the second stage compressor 144, and the third stage compressor 146 drive air along a core flow path C for compression and communication in the combustor 162. The airflow in the core flow path C is compressed by the first stage compressor 142, the second stage compressor 144, and the third stage compressor 146, is mixed with fuel and burned in the combustor 162, and is then expanded over the first stage turbine 152 and the second stage turbine 154. The first stage turbine 152 and the second stage turbine 154 rotationally drive the turbine shaft 158 in response to the expansion. The combustion products are exhausted from the second stage turbine 154 through a turbine exit 156.

Each of the first stage compressor 142, the second stage compressor 144, the third stage compressor 146, the first stage turbine 152, and the second stage turbine 154 may include rows of rotor assemblies (shown schematically) that carry airfoils that extend into the core flow path C. For example, the rotor assemblies can carry a plurality of rotating blades 125. The blades 125 of the rotor assemblies create or extract energy (in the form of pressure) from the core airflow that is communicated through the micro-turbine alternator system 100 along the core flow path C.

The micro-turbine alternator system 100 may include an inlet pressure boost system 500 to pre-compress the airflow 108 prior to entering the core flow path C. The inlet pressure boost system 500 includes a bottoming blower 520 and a bottoming turbine 510 operably connected to the bottoming blower 520 through a bottoming drive shaft 530. The bottoming blower 520 is configured to rotate when the bottoming turbine 510 is rotated by the catalytic exhaust 204 and/or combustor exhaust 202.

The bottoming blower 520 is configured to pull external airflow 108 through one or more air inlets 104 in the frame 106 into a bottoming compressor flow path C1. The bottoming blower 520 is configured to compress the external airflow 108 in the bottoming compressor flow path C1 and deliver the airflow 108 to the first stage compressor 142 in the core airflow path C.

Advantageously, this slightly pressurized air flows into the first stage compressor 142, where it is ingested into the high-speed micro-turbine alternator system 100. Using slightly pressurized air at the inlet to the first stage compressor 142 allows the high-speed micro-turbine alternator system 100 to operate at a higher speed, with a higher efficiency, allowing the micro-turbine alternator system 100 to achieve a higher power density.

Each of the bottoming turbine 510 and the bottoming blower 520 may include rows of rotor assemblies (shown schematically) that carry airfoils that extend into the compressor flow path C1. For example, the rotor assemblies can carry a plurality of rotating blades 540. The blades 540 of the rotor assemblies for the bottoming turbine 510 extract energy (in the form of pressure and temperature) from catalytic exhaust 204 (discussed further herein) that is communicated through the micro-turbine alternator system 100 along the core flow path C. The blades 540 of the rotor assemblies for the bottoming blower 520 create energy (in the form of pressure and temperature) from the airflow 108 that is communicated through the micro-turbine alternator system 100 along the compressor flow path C1.

The catalytic exhaust 204 exiting the turbine exit 156 is directed to the bottoming turbine 510 of the inlet pressure boost system 500. The catalytic exhaust 204 is then expanded over the bottoming turbine 510 of the inlet pressure boost system 500. The bottoming turbine 510 rotationally drives the bottoming drive shaft 530 in response to the expansion. Rotation of the bottoming drive shaft 530 causes the bottoming blower 520 to rotate and compress the airflow 108 within the compressor flow path C1.

Referring now to FIG. 4, with continued reference to FIGS. 1-3, an enlarged isometric cut-away view of an exhaust turbine reheat cycle 200 and a catalytic converter 260 of the micro-turbine alternator system 100 of FIG. 3 is illustrated, in accordance with an embodiment of the present disclosure. The exhaust turbine reheat cycle 200 is the path taken by the combustor exhaust 202 exiting the combustor 162 through the first stage turbine 152 to the catalytic converter 260.

The exhaust turbine reheat cycle 200 includes a heat exchanger 220 configured to transfer heat H1 from combustor exhaust 202 entering the first stage turbine 152 to combustor exhaust 202 entering the catalytic converter 260, which advantageously helps increase the efficiency of the second stage turbine 154 following the catalytic converter 260, while reducing the temperature of the combustor exhaust 202 entering the first stage turbine 152. The reduction in the temperature of the combustor exhaust 202 entering the first stage turbine 152 helps extended the life of the first stage turbine 152 by reducing an operating temperature of the first stage turbine 152. The second stage turbine 154 is located downstream of the first stage turbine 152 in a direction of a flow of the combustor exhaust 202 and the catalytic exhaust 204.

The exhaust turbine reheat cycle 200 also includes a catalytic converter 260. The catalytic converter 260 is configured to convert the combustor exhaust 202 to a catalytic exhaust 204, which includes at least exothermic heat H2. In a perfect chemical reaction between fuel and air in the combustor 162, the combustor exhaust 202 would only include carbon dioxide ($CO_2$) and water ($H_2O$). However, in real-world combustion, the combustor exhaust 202 may include carbon dioxide ($CO_2$), water ($H_2O$) and imperfect combustion byproducts including, but not limited to, nitrous oxide ($NO_X$), carbon monoxide (CO), unburned fuel/hydrocarbons (HC), oxygen (02), and/or nitrogen ($N_2$). The catalytic converter 260 is configured to convert the combustor exhaust 202 with the imperfect combustion byproducts into the catalytic exhaust 204 through a reduction process and an oxidation process. The reduction process is configured to convert the nitrous oxide ($NO_X$) and the carbon monoxide (CO) into nitrogen ($N_2$) and carbon dioxide ($CO_2$). The oxidation process is configured to convert the unburned fuel/hydrocarbons (HC), the carbon monoxide (CO), and the oxygen (02) into water ($H_2O$) and carbon dioxide ($CO_2$). The reaction within the catalytic converter 260 is highly exothermic and produces exothermic heat $H_2$. The catalytic exhaust 204 includes at least the exothermic heat $H_2$ and nitrogen ($N_2$), water ($H_2O$), and/or carbon dioxide ($CO_2$).

Advantageously, the reaction within the catalytic converter 260 helps reduces pollutant emissions from the microturbine alternator system 100. Advantageously, this exothermic heat $H_2$ further increases the temperature of the catalytic exhaust 204 entering the second stage turbine 154 and thus further increase the efficiency of the second stage turbine 154.

The catalytic converter 260 includes one or more catalysts to catalyze the reaction with the combustor exhaust 202 within the catalytic converter 260. The catalyst may include platinum, or any other catalyst known to one of skill in the art. In an embodiment, the catalytic converter 260 is a three-way catalytic converter.

The catalytic converter 260 is located between the first stage turbine 152 and the second stage turbine 154 with regard to flow. In other words, the catalytic converter 260 is located downstream of the first stage turbine 152 and upstream of the second stage turbine 154 in a direction a flow of the combustor exhaust 202 and the catalytic exhaust 204. In an alternative embodiment, the catalytic converter 260 may be before or upstream of the heat exchanger 220.

Combustor exhaust 202 exits the combustor 162 via a first passageway 210. The first passageway 210 extends from the combustor 162 to the heat exchanger 220 and fluidly connects the combustor 162 to the heat exchanger 220. The heat exchanger 220 may be an air-to-air heat exchanger. The heat exchanger 220 includes one or more heat rejection passageways 222 and one or more heat absorption passageways 224. The one or more heat absorption passageways 224 are thermally connected to the one or more heat rejection passageways 222. The one or more heat absorption passageways 224 may be physically connected to the one or more heat rejection passageways 222. The heat exchanger 220 is configured to transfer heat H1 from the combustor exhaust 202 in the one or more heat rejection passageways 222 to the combustor exhaust 202 in the one or more heat absorption passageways 224.

Specifically, the first passageway 210 extends from the combustor 162 to the one or more heat rejection passageways 222 and fluidly connects the combustor 162 to the one or more heat rejection passageways 222. The combustor exhaust 202 flows from the combustor 162 through the first passageway 210 and into the one or more heat rejection passageways 222.

The one or more heat rejection passageways 222 extend from the first passageway 210 to a second passageway 230 and fluidly connect the first passageway 210 to the second passageway 230. The combustor exhaust 202 flows from the first passageway 210 through the one or more heat rejection passageways 222 and into second passageway 230.

The second passageway 230 extends from the one or more heat rejection passageways 222 to the first stage turbine 152 and fluidly connects the one or more heat rejection passageways 222 to the first stage turbine 152. The combustor exhaust 202 flows from the one or more heat rejection passageways 222 through the second passageway 230 and into the first stage turbine 152.

The first stage turbine 152 extends from the second passageway 230 to a third passageway 240 and fluidly connects the second passageway 230 to the third passageway 240. The combustor exhaust 202 flows from the second passageway through the first stage turbine 152 and into the third passageway 240.

The third passageway 240 extends from the first stage turbine 152 to the one or more heat absorption passageways 224 and fluidly connects the first stage turbine 152 to the one or more heat absorption passageways 224. The combustor exhaust 202 flows from the first stage turbine 152 through the third passageway 240 and into the one or more heat absorption passageways 224.

The one or more heat absorption passageways 224 extend from the third passageway 240 to a fourth passageway 250 and fluidly connects the third passageway 240 to the fourth passageway 250. The combustor exhaust 202 flows from the third passageway 240 through the one or more heat absorption passageways 224 and into the fourth passageway 250. Heat H1 is transferred to the combustor exhaust 202 in the one or more heat absorption passageways 224 from the one or more heat rejection passageways 222.

The fourth passageway 250 extends from the one or more heat absorption passageways 224 to the catalytic converter 260 and fluidly connects the one or more heat absorption passageways 224 to the catalytic converter 260. The combustor exhaust 202 flows from the one or more heat absorption passageways 224 through the fourth passageway 250 and into the catalytic converter 260.

The catalytic converter 260 extends from the fourth passageway 250 to a fifth passageway 270 and fluidly connects the fourth passageway 250 to the fifth passageway 270. The combustor exhaust 202 flows from the fourth passageway 250 through the catalytic converter 260, where it is converted into the catalytic exhaust 204, which then flows into the fifth passageway 270.

The fifth passageway 270 extends from the catalytic converter 260 to the second stage turbine 154 and fluidly connects the catalytic converter 260 to the second stage turbine 154. The catalytic exhaust 204 flows from the catalytic converter 260 through the fifth passageway 270 and into the second stage turbine 154.

The second stage turbine 154 extends from the fifth passageway 270 to a turbine outflow passage 280 and fluidly connects the fifth passageway 270 to the turbine outflow passage 280. The catalytic exhaust 204 flows from the fifth passageway 270 through the second stage turbine 154 and into the turbine outflow passage 280.

The turbine outflow passage 280 extends from the second stage turbine 154 to a recuperator 410 (see FIG. 5) and fluidly connects the second stage turbine 154 to the recuperator 410. The catalytic exhaust 204 flows from the second stage turbine 154 through the turbine outflow passage 280 and into the recuperator 410.

In one non-limiting example, a temperature of the combustor exhaust 202 may be at a first temperature in the first passageway 210, a second temperature in the second passageway 230, a third temperature in the third passageway 240, and a fourth temperature in the fourth passageway 250. The catalytic exhaust 204 may be at a fifth temperature in the fifth passageway 270 and a sixth temperature in the turbine outflow passage 280. The second temperature may be less than the first temperature, the third temperature may be less than the second temperature, the fourth temperature may be less than the fifth temperature and the second temperature, the fifth temperature may be equivalent to the second temperature, fifth temperature, may be greater than the fourth temperature, the sixth temperature may be less than the third temperature.

Referring now to FIG. 5, with continued reference to FIGS. 1-4, an isometric cut-away view of a waste heat recovery system 400 and an inlet pressure boost system 500 of the micro-turbine alternator system 100 is illustrated, in accordance with an embodiment of the present disclosure.

The waste heat recovery system 400 includes a recuperator 410 and a thermal electric generator array 420. The waste heat recovery system 400 is configured to receive exhaust 206 from the second stage turbine 154. Embodiments disclosed herein may be applicable to a micro-turbine alternator system 100 with or without the catalytic converter 260, thus the exhaust 206 may be combustor exhaust 202 or catalytic exhaust 204. Further, embodiment disclosed herein may be applicable to a micro-turbine alternator system 100 with or without the heat exchanger 220.

As aforementioned, the turbine outflow passage 280 extends from the second stage turbine 154 to the recuperator 410 and fluidly connects the second stage turbine 154 to the recuperator 410. The exhaust 206 flows from the second stage turbine 154 through the turbine outflow passage 280 and into the recuperator 410.

The recuperator 410 may be an air-to-air heat exchanger. The recuperator 410 includes one or more heat rejection passageways 412 and one or more heat absorption passageways 414.

A compressor outlet passage 484 extends from the third stage compressor 146 to the one or more heat absorption passageways 414 and fluidly connects the third stage compressor 146 to the one or more heat absorption passageways 414. Compressed air 482 flows from the third stage compressor 146 through the compressor outlet passage 484 and into the one or more heat absorption passageways 414.

The turbine outflow passage 280 extends from the second stage turbine 154 to the one or more heat rejection passageways 412 and fluidly connects the second stage turbine 154 to the one or more heat rejection passageways 412. The exhaust 206 flows from the second stage turbine 154 through the turbine outflow passage 280 and into the one or more heat rejection passageways 412.

The one or more heat absorption passageways 414 are thermally connected to the one or more heat rejection passageways 412. The one or more heat absorption passageways 414 may be physically connected to the one or more heat rejection passageways 412. The recuperator 410 is configured to transfer heat H3 from the exhaust 206 in the one or more heat rejection passageways 412 to the compressed air 482 in the one or more heat absorption passageways 414, which increases a temperature of the compressed air 482 that then is sent to the combustor 162. Advantageously, increasing the temperature of the compressed air 482 prior to entry into the combustor 162 increases the efficiency of the combustor 162. Also, advantageously, by pre-heating the air entering the combustor 162, less fuel is needed to elevate the air temperature up to the desired turbine inlet temperature. Using less fuel, for a given output power level increases the overall efficiency of the micro-turbine alternator system 100.

The one or more heat absorption passageways 414 extend from the compressor outlet passage 484 to a combustor inlet passage 490 and fluidly connects the compressor outlet passage 484 to the combustor inlet passage 490. Compressed air 482 flows from the compressor outlet passage 484 through the one or more heat absorption passageways 414 and into the combustor inlet passage 490.

The combustor inlet passage 490 extends from the one or more heat absorption passageways 414 to the combustor 162 and fluidly connects the one or more heat absorption passageways 414 to the combustor 162. Compressed air 482 flows from the one or more heat absorption passageways 414 through the combustor inlet passage 490 and into the combustor 162.

The one or more heat rejection passageways 412 extend from the turbine outflow passage 280 to a thermal electric generator array inflow passage 416 and fluidly connects the turbine outflow passage 280 to the thermal electric generator array inflow passage 416. The exhaust 206 flows from the turbine outflow passage 280 through the one or more heat rejection passageways 412 and into the thermal electric generator array inflow passage 416.

The thermal electric generator array 420 is a thermal electric generator. The thermal electric generator array 420 includes a hot side passageway 422, a cold side passageway 424, a hot side heat transfer surface 426, a cold side heat transfer surface 428, and a thermo electric device 425 interposed between the hot side heat transfer surface 426 and the cold side heat transfer surface 428. The hot side passageway 422 is configured to receive the exhaust 206 from the recuperator 410. The hot side passageway 422 is configured to transfer heat H4 from the exhaust 206 to the hot side heat transfer surface 426. The cold side passageway 424 is configured to transfer air 108 to the first stage compressor 142. The cold side heat transfer surface 228 is configured to configured to be cooled by the cold side passageway 424, or in order words heat H5 may move from the cold side heat transfer surface 228 to the cold side passageway 424.

The hot side heat transfer surface 426 is thermally connected to the hot side passageway 422. The hot side heat transfer surface 426 may be physically connected to the hot side passageway 422. The hot side heat transfer surface 426 absorbs heat H4 from the hot side passageway 422. The hot side heat transfer surface 426 is at about the same temperature as the hot side passageway 422.

Using the thermo electric device 425 electricity is generated from the temperature difference (i.e., delta) between the hot side heat transfer surface 426 and the cold side heat transfer surface 428. Moving the hot air across the hot side heat transfer surface 426 keeps the hot side heat transfer surface 426 hot, and moving the cold air across the cold side heat transfer surface 428 keeps the cold side heat transfer surface 428 cold. Heat wants to migrate from the hot side heat transfer surface 426 to the cold side heat transfer surface 428 through the thermo electric device 425. Without the moving hot air and the moving cold air, the temperatures of the hot side heat transfer surface 426 and the cold side heat transfer surface 428 would eventually become the same, and the electric flow may cease to happen. Heat is absorbed from the hot side heat transfer surface 426 on the thermo-electric generator and it is converted to electricity. Some heat (e.g., via the inefficiency of the thermo electric device 425) may be conducted through the thermo electric device 425 to the cold side heat transfer surface 428, where the cold air is required to take it away, in order to keep the cold side heat transfer surface 428 cold.

The cold side heat transfer surface 428 is thermally connected to the cold side passageway 424. The cold side heat transfer surface 428 may be physically connected to the cold side passageway 424. The cold side passageway 424 may absorb heat H5 from the cold side heat transfer surface 428. The cold side heat transfer surface 428 is at about the same temperature as the cold side passageway 424.

The thermo electric device 425 may be thermally connected to the hot side heat transfer surface 426 and the cold side heat transfer surface 428. The thermo electric device 425 may be physically connected to the hot side heat transfer surface 426 and the cold side heat transfer surface 428. The thermo electric device 425 is configured to generate an electrical current based on a temperature difference between the cold side heat transfer surface 428 and the hot side heat transfer surface 426. The thermo electric device 425 is configured to generate electricity based on the Seebeck effect.

Advantageously, this additional electric power is added to the electric power being generated by the electric generator 130, increasing the output power of the micro-turbine alternator system 100, increasing the system efficiency and the power density.

The thermal electric generator array inflow passage 416 extend from the one or more heat rejection passageways 412 to the hot side passageway 422 and fluidly connects the one or more heat rejection passageways 412 to the hot side passageway 422. The exhaust 206 flows from the one or more heat rejection passageways 412 through the thermal electric generator array inflow passage 416 and into the hot side passageway 422.

The hot side passageway 422 extends from the thermal electric generator array inflow passage 416 to a bottoming system turbine inflow passage 440 and fluidly connects the thermal electric generator array inflow passage 416 to the bottoming system turbine inflow passage 440. The exhaust 206 flows from the thermal electric generator array inflow passage 416 through the hot side passageway 422 and into the bottoming system turbine inflow passage 440.

The bottoming system turbine inflow passage 440 extends from the hot side passageway 422 to the bottoming turbine 510 and fluidly connects the hot side passageway 422 to the bottoming turbine 510. The exhaust 206 flows from the hot side passageway 422 through the bottoming system turbine inflow passage 440 and into the bottoming turbine 510.

The bottoming turbine 510 extends from the bottoming system turbine inflow passage 440 to an exhaust outlet 580 and fluidly connects the bottoming system turbine inflow passage 440 to the exhaust outlet 580. The exhaust 206 flows from the bottoming system turbine inflow passage 440 through the bottoming turbine 510 and into the exhaust outlet 580, where the exhaust 206 exits both the inlet pressure boost system 500 and the micro-turbine alternator system 100.

The bottoming system blower inflow passage 450 extends from the air inlet 104 to the bottoming blower 520 and fluidly connects the air inlet 104 to the bottoming blower 520. The air 108 flows from the air inlet 104 through the bottoming system blower inflow passage 450 and into the bottoming blower 520.

The bottoming blower 520 extends from the bottoming system blower inflow passage 450 to a bottoming system blower outflow passage 454 and fluidly connects the bottoming system blower inflow passage 450 to the bottoming system blower outflow passage 454. The air 108 flows from the bottoming system blower inflow passage 450 through the bottoming blower 520 and into the bottoming system blower outflow passage 454.

The bottoming system blower outflow passage 454 extends from the bottoming blower 520 to the cold side passage 424 and fluidly connects the bottoming blower 520 to the cold side passage 424. The air 108 flows from the bottoming blower 520 through the bottoming system blower outflow passage 454 and into the cold side passage 424.

The cold side passage 424 extends from the bottoming system blower outflow passage 454 to a first stage compressor inflow passage 460 and fluidly connects the bottoming system blower outflow passage 454 to the first stage compressor inflow passage 460. The air 108 flows from the bottoming system blower outflow passage 454 through the cold side passage 424 and into the first stage compressor inflow passage 460.

The first stage compressor inflow passage 460 extends from the cold side passage 424 to the first stage compressor 142 and fluidly connects the cold side passage 424 to the first stage compressor 142. The air 108 flows from the cold side passage 424 through the first stage compressor inflow passage 460 and into the first stage compressor 142.

The first stage compressor 142 extends from the first stage compressor inflow passage 460 to a second stage compressor inflow passage 470 and fluidly connects the first stage compressor inflow passage 460 to the second stage compressor inflow passage 470. The air 108 flows from the first stage compressor inflow passage 460 through the first stage compressor 142 and into the second stage compressor inflow passage 470.

The second stage compressor inflow passage 470 extends from the first stage compressor 142 to the second stage compressor 144 and fluidly connects the first stage compressor 142 to the second stage compressor 144. The air 108 flows from the first stage compressor 142 through the second stage compressor inflow passage 470 and into the second stage compressor 144.

The second stage compressor 144 extends from the second stage compressor inflow passage 470 to a third stage compressor inflow passage 480 and fluidly connects the second stage compressor inflow passage 470 to the third stage compressor inflow passage 480. The air 108 flows from the second stage compressor inflow passage 470 through the second stage compressor 144 and into the third stage compressor inflow passage 480.

The third stage compressor inflow passage 480 extends from the second stage compressor 144 to the third stage compressor 146 and fluidly connects the second stage compressor 144 to the third stage compressor 146. The air 108 flows from the second stage compressor 144 through the third stage compressor inflow passage 480 and into the third stage compressor 146.

The third stage compressor 146 extends from the third stage compressor inflow passage 480 to the compressor outlet passage 484 and fluidly connects the third stage compressor inflow passage 480 to the compressor outlet passage 484. The air 108 flows from the third stage compressor inflow passage 480 through the third stage compressor 146 and into the compressor outlet passage 484.

Technical effects and benefits of the features described herein include flowing exhaust through a recuperator to heat air prior to a combustor of a micro-turbine alternator system and then flowing the exhaust through a thermal electric generator array to generator electricity in response to a temperature difference between air entering micro-turbine alternator system and the exhaust.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical power generation system, comprising:
 a micro-turbine alternator, comprising:
  a combustor;
  at least one turbine configured to be driven by an exhaust from the combustor, including a first stage turbine; and a second stage turbine;
  at least one compressor operably connected to the combustor to provide a compressed airflow to the combustor, including: a first stage compressor; a second stage compressor; and a third stage compressor
  the turbines and compressors are oriented along a central longitudinal axis, and combustion products are exhausted from the second stage turbine through a turbine exit;
  one or more shafts connecting the at least one turbine to the at least one compressor such that rotation of the at least one turbine drives rotation of the at least one compressor; and wherein at least one of the one or more shafts passes through the electric generator;
  an electric generator disposed along the one or more shafts, between the first stage compressor and the second stage compressor measured along the central longitudinal axis A, such that electrical power is generated via rotation of the one or more shafts, wherein the electric generator is disposed along the one or more shafts between the first stage compressor and the second stage compressor; and
 a recuperator configured to transfer heat from the exhaust exiting the at least one turbine to the compressed airflow from the at least one compressor entering the combustor;
 a bottoming system located on the central longitudinal axis, comprising: a bottoming blower configured to deliver air to the at least one compressor; a bottoming drive shaft and a bottoming turbine located operably connected to the bottoming blower through the bottoming drive shaft, wherein the bottoming blower is configured to rotate when the bottoming turbine is rotated by the exhaust directed to it from the turbine exit via the recuperator; and the bottoming blower is configured to pull external airflow, through one or more air inlets in a frame of the system, into a bottoming compressor flow path C located between the first stage compressor and the bottoming system along the central longitudinal axis A.

2. The electrical power generation system of claim 1, wherein the recuperator is configured to transfer heat from the exhaust exiting the at least one turbine to the compressed airflow from the third stage compressor entering the combustor.

3. The electrical power generation system of claim 1, further comprising:
 a thermal electric generator array comprising:
  a hot side passageway configured to receive the exhaust from the recuperator;
  a cold side passageway configured to transfer air to the at least one compressor;
  a hot side heat transfer surface thermally connected to the hot side passageway;
  a cold side heat transfer surface thermally connected to the cold side passageway; and
  a thermo electric device interposed between the hot side heat transfer surface and the cold side heat transfer surface, the thermo electric device being configured to generate an electrical current based on a temperature difference between the cold side heat transfer surface and the hot side heat transfer surface.

4. An electrical power generation system, comprising:
 a micro-turbine alternator, comprising:
  a combustor;
  at least one turbine configured to be driven by an exhaust from the combustor;
  at least one compressor operably connected to the combustor to provide a compressed airflow to the combustor;
  one or more shafts connecting the at least one turbine to the at least one compressor such that rotation of the at least one turbine drives rotation of the at least one compressor; and
  a thermal electric generator array comprising:
   a hot side passageway configured to receive the exhaust from the at least one turbine;
   a cold side passageway configured to transfer air to the at least one compressor;
   a hot side heat transfer surface thermally connected to the hot side passageway;

a cold side heat transfer surface thermally connected to the cold side passageway; and
a thermo electric device interposed between the hot side heat transfer surface and the cold side heat transfer surface, the thermo electric device being configured to generate an electrical current based on a temperature difference between the cold side heat transfer surface and the hot side heat transfer surface,
wherein the at least one compressor comprises:
a first stage compressor;
a second stage compressor; and
a third stage compressor,
wherein the cold side passageway configured to transfer air to the first stage compressor.

5. The electrical power generation system of claim 4, wherein the at least one turbine comprises:
a first stage turbine; and
a second stage turbine, wherein the hot side passageway is configured to receive the exhaust from the second stage turbine.

6. The electrical power generation system of claim 4, further comprising:
a bottoming system comprising:
a bottoming blower configured to deliver air to the at least one compressor;
a bottoming drive shaft; and
a bottoming turbine operably connected to the bottoming blower through the bottoming drive shaft, wherein the bottoming blower is configured to rotate when the bottoming turbine is rotated by the exhaust.

7. The electrical power generation system of claim 4, further comprising:
an electric generator disposed along the one or more shafts such that electrical power is generated via rotation of the one or more shafts, wherein the electric generator is disposed along the one or more shafts between the first stage compressor and the second stage compressor.

8. The electrical power generation system of claim 7, wherein at least one of the one or more shafts passes through the electric generator.

9. An electrical power generation system, comprising:
a micro-turbine alternator, comprising:
a combustor;
at least one turbine configured to be driven by an exhaust from the combustor;
at least one compressor operably connected to the combustor to provide a compressed airflow to the combustor;
one or more shafts connecting the at least one turbine to the at least one compressor such that rotation of the at least one turbine drives rotation of the at least one compressor; and
a bottoming system comprising:
a bottoming blower configured to deliver air to the at least one compressor;
a bottoming drive shaft; and
a bottoming turbine operably connected to the bottoming blower through the bottoming drive shaft, wherein the bottoming blower is configured to rotate when the bottoming turbine is rotated by the exhaust;
wherein the at least one compressor comprises:
a first stage compressor;
a second stage compressor; and
a third stage compressor,
wherein the bottoming blower is configured to provide air to the first stage compressor.

10. The electrical power generation system of claim 9, wherein the at least one turbine comprises:
a first stage turbine; and
a second stage turbine, wherein the bottoming turbine is configured to receive the exhaust from the second stage turbine.

11. The electrical power generation system of claim 9, further comprising:
an electric generator disposed along the one or more shafts such that electrical power is generated via rotation of the one or more shafts, wherein the electric generator is disposed along the one or more shafts between the first stage compressor and the second stage compressor.

12. The electrical power generation system of claim 11, wherein at least one of the one or more shafts passes through the electric generator.

* * * * *